Feb. 28, 1956  G. O. FORSETH  2,736,565
COASTER SLED WITH FLEXIBLE RUNNERS
Filed June 22, 1953  2 Sheets-Sheet 1

INVENTOR.
GEORGE O. FORSETH
BY
*Paul, Moore & Digger*
ATTORNEYS

Feb. 28, 1956

G. O. FORSETH 2,736,565

COASTER SLED WITH FLEXIBLE RUNNERS

Filed June 22, 1953

INVENTOR.
GEORGE O. FORSETH
BY
Paul, Moore + Dugger
ATTORNEYS

United States Patent Office 2,736,565
Patented Feb. 28, 1956

2,736,565

COASTER SLED WITH FLEXIBLE RUNNERS

George O. Forseth, Minneapolis, Minn.

Application June 22, 1953, Serial No. 363,081

2 Claims. (Cl. 280—22)

This invention relates to new and useful improvements in sleds of the general type disclosed in my Patent Number 2,499,639, granted March 7, 1950.

There are now available numerous coaster sleds having flexible runners and means for flexing the runners to guide the sled on its course, when coasting down a hill or incline. While such known sleds have been acceptable by the trade, they have not been entirely satisfactory for various reasons, and an important object of the present invention, therefore, is to provide a coaster sled of this general type wherein all of the objectionable features now inherent in such sleds have been completely and entirely eliminated without sacrificing any of the desirable qualities of such sleds, and whereby such sleds may be manufactured in quantity production at a cost whereby they may be sold to the trade at a very nominal price.

A further object of the present invention is to provide a sled comprising an annular metallic deck supporting frame having its rear end portion mounted upon and fixedly secured to a suitable bolster having depending end portions to which the rear end portions of the usual runners of the sled are secured, and the forward end of the deck supporting frame is mounted upon a front bolster having depending ends similarly secured to the runners, the connections between said deck supporting frame and the front bolster permitting limited lateral movement of the front bolster relative to the deck supporting frame, thereby to facilitate laterally flexing the runners to guide the sled in its travel.

A further object of the invention resides in the simple and inexpensive construction of the steering linkage of the sled, the parts of which are so oriented that the runners may readily be flexed by manual manipulation of a conveniently disposed steering bar to guide the sled, and said steering bar, when released, automatically returning to its normal position to guide the sled in a straight course.

Other objects of the invention reside in the novel construction of the forward end of the deck supporting frame and the steering linkage attached thereto for flexing the runners to guide the sled in its travel; in the construction of such a sled embodying a minimum number of parts, and all such parts being so designed that they may readily be assembled to complete the formation of the sled with a minimum of operations, whereby the sled may be manufactured at low cost; in the provision of such a sled of rugged and substantial construction, and which is extremely light in weight; and in the novel construction of the steering mechanism which is such that it may readily be manipulated by a young child to accurately guide the sled on its course.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

An important feature of the novel coaster sled herein disclosed resides in the unique construction of its supporting frame, whereby a very rugged and substantial structure is provided, which is capable of withstanding severe turning strains and other rough usage to which such devices are often subjected when in use.

Figure 1:
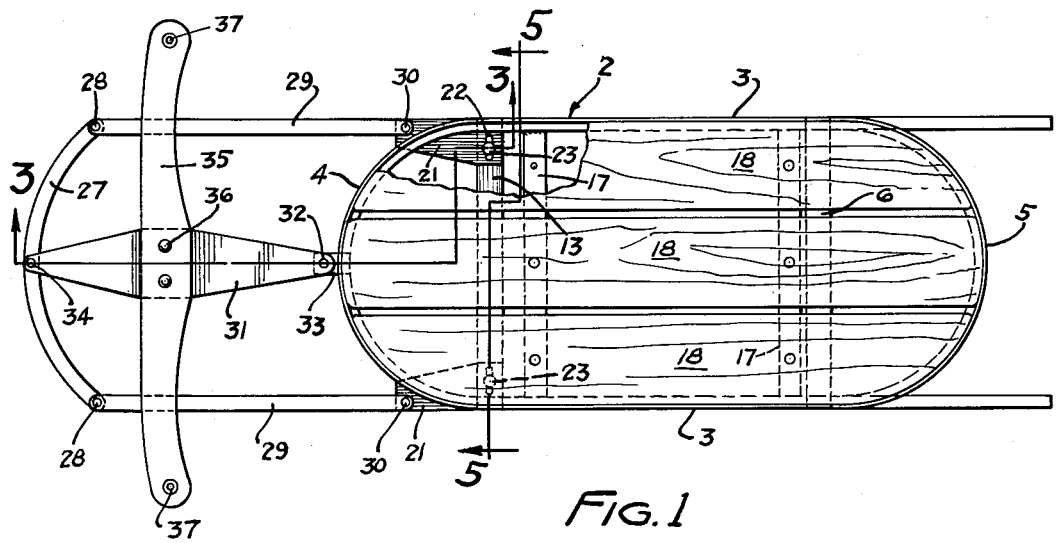
Figure 1 is a plan view of the novel sled herein disclosed, with the parts thereof in their normal positions.
Figure 4:
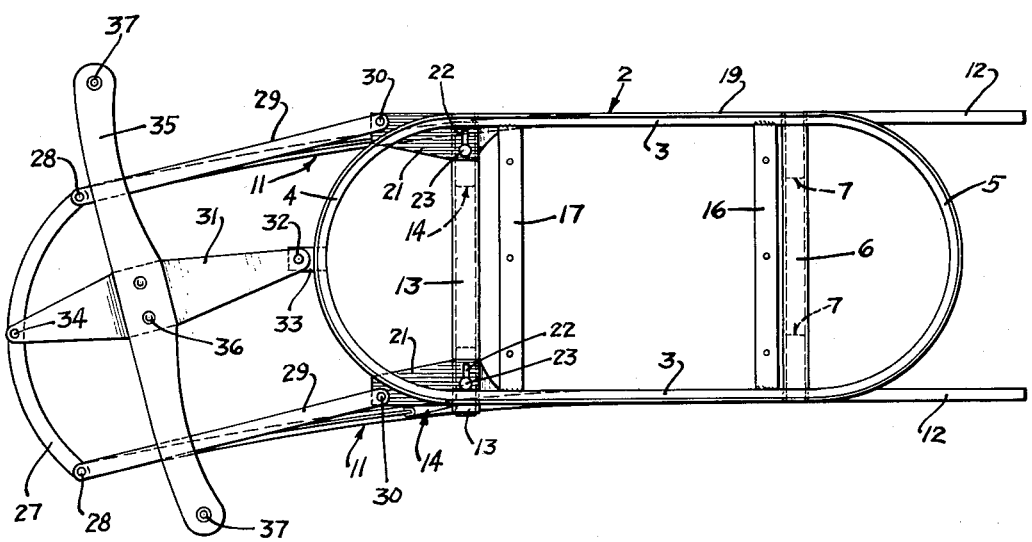
Figure 4 is a plan view of the sled with the deck omitted, and showing the runners flexed to steer the sled to the left.

The supporting structure comprises an annular metallic frame, generally designated by the numeral 2, having parallel side rails 3—3. The front and rear ends 4 and 5, respectively, of the frame 2, are preferably semi-circular in configuration, as shown in Figures 1 and 4, although they may be otherwise formed, if desired.

The rear end portion of the deck supporting frame 2 is supported upon a suitable bolster 6, to which it is permanently secured by suitable means, such as welding. The bolster 6 is provided at its opposed ends with depending brackets 7, preferably having spaced legs 8, the lower terminals of which are secured to the upright flange 9 of a pair of spaced parallel runners 11.

Figure 6:
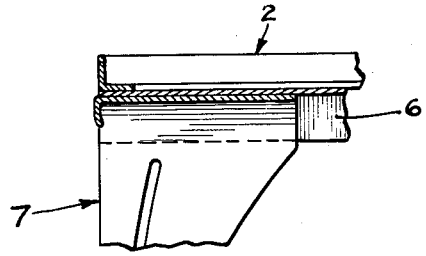
Figure 6 is an enlarged detail sectional view on the line 6—6 of Figure 2, showing only one side of the sled.

The upper end portions of the brackets 7 are preferably shaped as shown in Figure 6, and are fitted between the depending flanges of the rear bolster 6 and welded thereto to provide, in effect, an integral structure.

Figure 2:
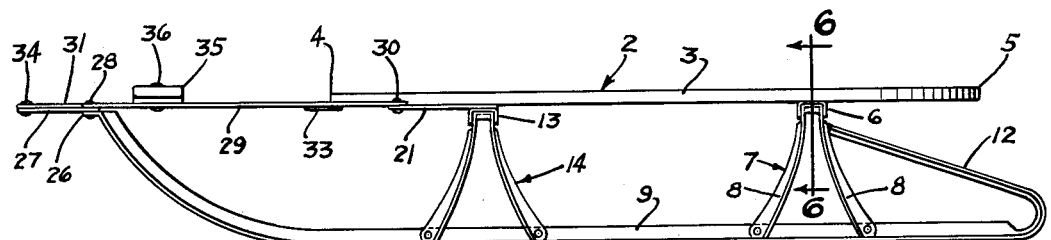
Figure 2 is a side elevation of Figure 1.
Figure 3:
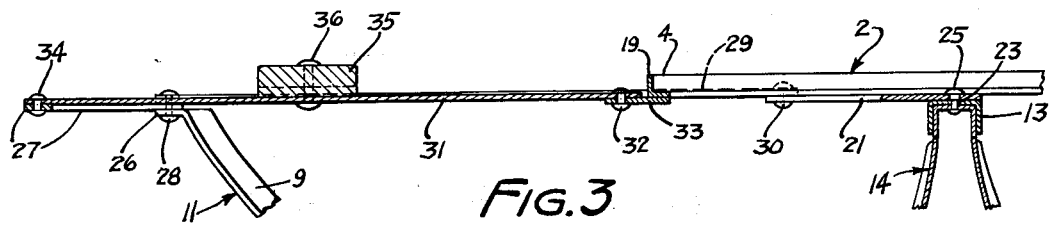
Figure 3 is a longitudinal sectional view on the line 3—3 of Figure 1, on an enlarged scale.

The rear end portions of the runners are preferably bent upwardly and forwardly, as shown at 12 in Figure 2, and have their terminals welded to the brackets 7, thereby to strengthen the rear end portions of the runners and simultaneously provide rounded ends which are less likely to cause injury to individuals contacting therewith.

A similar bolster 13 supports the forward end of the deck supporting frame 2, and is provided at its ends, with brackets 14, similar to the brackets 7 provided at the ends of the rear bolster 6. The upper ends of brackets 14 are similarly welded to the bolster 13 to provide, in effect, an integral part thereof, and their lower ends are secured to the upright flanges 9 of the runners in a manner similar to the brackets 7, as indicated at 15 in Figure 5.

Suitable cross members 16 and 17, preferably of flat bar stock, are provided adjacent to the bolsters 6 and 13, respectively, as shown in Figures 1 and 4, and are shown having their terminals abuttingly engaged with the inner edges of the horizontal flanges of the side rails 3—3 of the deck supporting frame 2, by welding, as is well known in the art. The upper surfaces of the cross members 16 and 17 are substantially flush with the upper surfaces of the horizontal flange of the similar frame member 2, so that when a deck 18 is positioned thereon, the ends and sides of the deck may also be supported on said horizontal flange. The cross rails 16 and 17 are preferably apertured, as shown in Figure 4, to receive rivets or bolts for securing the deck 18 to the frame 2, as will be understood by reference to Figure 1. By thus securing the deck 18 to the frame 2, the edges of the deck will also be protected by the upright annular flange 19 of the deck supporting frame, as will be understood by reference to Figures 1, 5, and 6.

Another feature of the invention resides in the connections between the front bolster 13 and the deck supporting frame 2, which are such as to permit limited lateral movement of the bolster with respect to the deck supporting frame to permit free flexing of the intermediate portions of the runners, when the steering mechanism is operated to guide the sled in its traveling movements.

To thus movably connect the bolster 13 to the deck supporting frame, a pair of plate elements 21 are welded or otherwise permanently secured to the front end portions of the deck supporting frame, and project inwardly from the sides thereof, and overlie the end portions of the bolster, as best illustrated in Figures 1 and 2. The overlying portions of the plates 21—21 have elongated openings or slots 22 therein, disposed longitudinally of the bolster 13.

Figure 5:
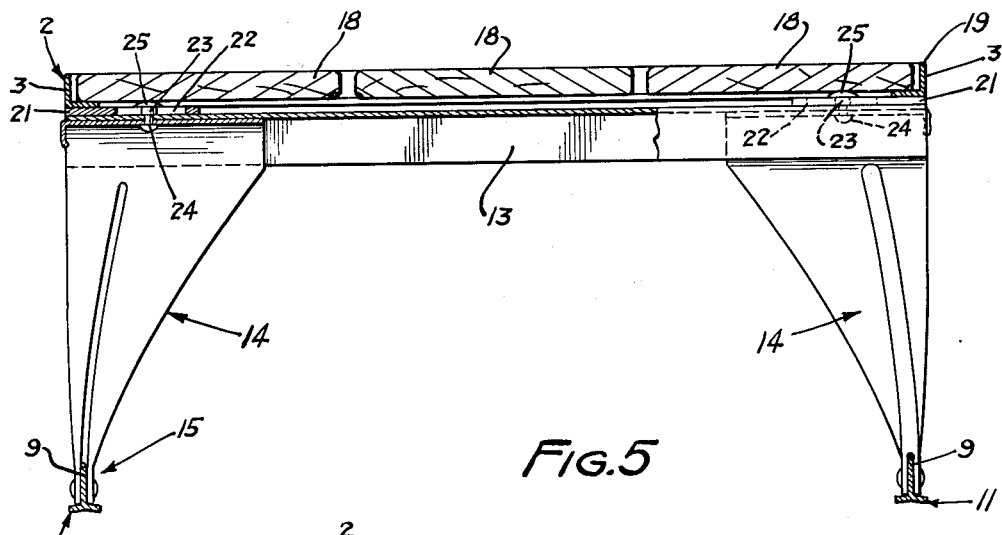
Figure 5 is an enlarged cross-sectional view on the line 5—5 of Figure 1, showing the movable connection between the deck supporting frame and the front bolster.

Suitable studs or rivets 23 have their lower end portions fixed to bolster, preferably by riveting, as indicated at 24 in Figure 5. The studs 23 traverse the elongated openings or slots 22 in the plate elements 21, and are provided with enlarged heads 25 at their upper ends for inseparably securing the deck supporting frame to the bolster 13. The bolster may thus move laterally with respect to the deck supporting frame, as will readily be understood by reference to Figure 4, thereby to permit flexing of the intermediate portions of the runners to facilitate guiding the sled in its forward movement. The runners may be flexed substantially from the rear bolster brackets 7 to the forward ends thereof.

From the front bolster 13, the runners extend forwardly and curve upwardly, as is customary, and have their front terminals 26 horizontally disposed and apertured, whereby a tie member 27 may be interposed between the front terminals of the runners, and pivotally connected thereto by suitable pivot elements 28. The tie member 27 is preferably forwardly curved, as shown in Figures 1 and 4, to enhance the appearance of the sled.

Elongated link members 29 have their forward ends pivotally connected to the forward ends of the runners by the pivot pins 28, and their rear ends to the plate elements 21 by pivots 30, as illustrated in Figures 1, 2 and 4. The link members 29 cooperate to support and reinforce the forward ends of the runners, as will be understood by reference to Figures 1, 2 and 4.

The steering mechanism for the sled is best illustrated in Figures 1 and 4, and comprises an elongated member 31, having its rear end pivotally connected to the forward end portion 4 of the deck supporting frame 2 by a pivot 32, shown secured to a small bracket 33, which may be welded to the frame 2, as will be understood. The opposite or front end of the member 31 is similarly pivotally connected to the central portion of the tie member 27 by a pivot pin 34.

A steering bar 35 is fixedly secured to the intermediate portion of the member 31 by such means as rivets or bolts 36. The steering bar 35 is disposed at right angles to the member 31, and has its end portions extending outwardly beyond the sides of the sled, as shown in Figures 1 and 4, whereby they may be conveniently manipulated to guide the sled on its course. Apertures 37 may be provided in the ends of the steering bar to facilitate attaching a tow rope or cord thereon.

When the sled is guided by an individual positioned thereon, the steering bar 35 is manipulated as shown in Figure 4, that is, it is bodily swung to the left, when it is desired to turn left; or to the right, when it is desired to turn in that direction. Such manipulation of the steering bar 35, because of its pivotal connections with the front end of the deck supporting frame 2 and the tie member 27, causes the front bolster 13 to bodily shift or move to the left with respect to the deck supporting frame, because of its movable connections with said frame through the studs 23 and the elongated openings or slots 22. Such relative movement of the front bolster 13 permits the runners to flex throughout their intermediate portions, as indicated in Figure 4, thereby minimizing turning strains in the runners, and at the same time minimizing the effort exerted on the steering bar 35 to guide the sled on its course.

The unique manner in which the deck supporting frame 2 is mounted upon the front and rear bolsters, and the configuration of the frame 2, combine to provide a supporting structure for the deck 18 of the sled which is capable of withstanding considerable rough usage and wear, to which sleds of this general type are often subjected. Also by forming the annular frame 2 with an outer upstanding flange, the edges of the deck are protected from damage, should the sled collide with or engage an obstruction while in motion. All parts of the sled present the utmost in simplicity, and may readily be manufactured in mass production at very low cost. The parts are also so designed that they may readily be assembled to complete the formation of the sled in a minimum length of time, with a resultant reduction in labor and in the cost of producing the sled in large quantities.

The foregoing detailed description has been given for clearness of understanding only, and no unnecessary limitations should be understood therefrom, but the appended claims should be construed as broadly as permissible in view of the prior art.

I claim as my invention:

1. In a coaster sled of the class described, an annular deck supporting frame comprising parallel side rails and front and rear semi-circular end portions, said frame being formed from a metallic bar of angle iron cross section having a lower horizontally disposed flange and an outer upright flange which defines the configuration of the deck supporting frame, a plurality of flat cross members interposed between said side rails and having their terminals abuttingly engaged with the inner edges of said side rails and fixedly welded thereto, an inverted channel-shaped bolster fixedly secured to the rear end portion of the deck supporting frame with its spaced parallel legs directed downwardly, brackets having elongated portions fitting into said channel shaped bolster and permanently welded thereto, said brackets depending from said bolster, runners secured to the lower-most ends of said brackets and extending forwardly thereof in spaced parallel relation, a front bolster of similar cross section at the forward end of the deck supporting frame having similar depending brackets secured to the ends thereof, the bottom ends of said front brackets being similarly secured to said runners, plate elements secured to the forward side portions of said annular deck supporting frame and each having an elongated slot therein, said slots being disposed at right angles to the longitudinal axis of said frame, studs secured to the front bolster and traversing said slots and cooperating therewith to inseparably secure the front end of the deck supporting frame to the front bolster, and permitting limited lateral movement of the frame relative to said front bolster to facilitate laterally flexing the runners to guide the sled in its forward movement, the forward end portions of said runners curving upwardly and having horizontally disposed terminal portions, a tie bar interposed between and pivotally connected to said terminal portions, elongated links having their forward ends pivotally connected to the ends of said tie bar and having their rear ends pivotally connected to said plate elements, and a steering mechanism operatively connected to said tie bar and the forward end of the deck supporting frame for laterally flexing the runners to guide the sled.

2. A coaster sled according to claim 1, wherein the steering mechanism comprises a longitudinal member having its front end pivoted to the intermediate portion of said tie bar and its rear end to the front end portion of the deck supporting frame, and an operating handle having its intermediate portion fixedly secured to the central portion of said longitudinal member with its end portions extending laterally beyond the sides of the deck supporting frame to provide handles for manipulating said longitudinal member to cause it to laterally flex the runners.

References Cited in the file of this patent

UNITED STATES PATENTS

| | | |
|---|---|---|
| 408,681 | Allen | Aug. 13, 1889 |
| 1,041,324 | Miller | Oct. 15, 1912 |
| 1,090,152 | Hornquist | Mar. 17, 1914 |
| 1,104,799 | Himebaugh | July 28, 1914 |
| 2,006,328 | Scholtes | June 25, 1935 |
| 2,012,767 | Miller | Aug. 27, 1935 |
| 2,037,076 | Kidder | Apr. 14, 1936 |
| 2,289,426 | Holbrook | July 14, 1942 |
| 2,499,639 | Forseth | Mar. 7, 1950 |